May 30, 1967   G. L. HILDEBRAND   3,321,980
GYROSCOPE APPARATUS
Filed Dec. 29, 1964
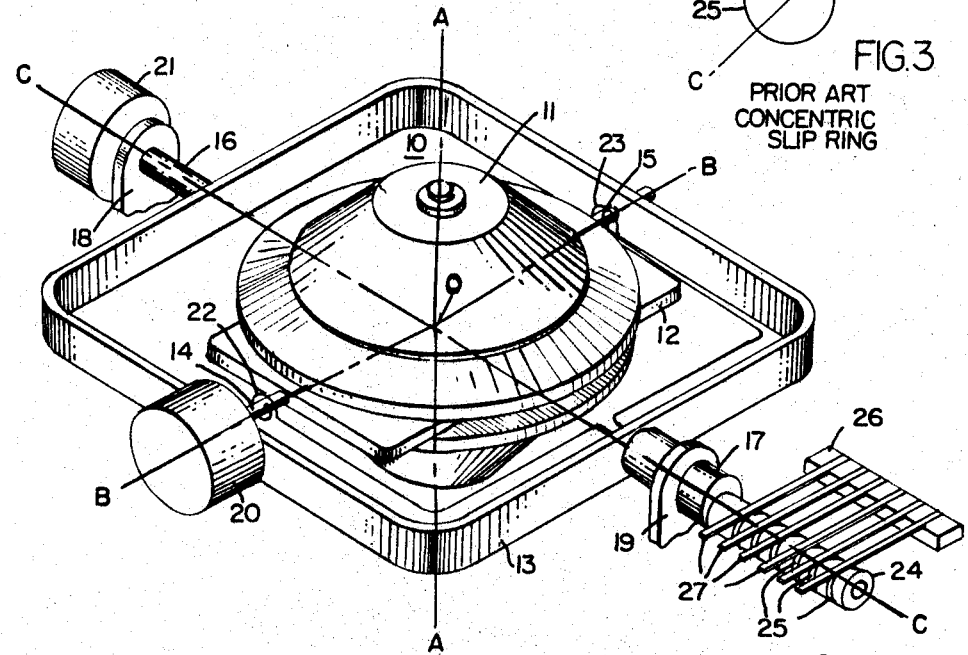
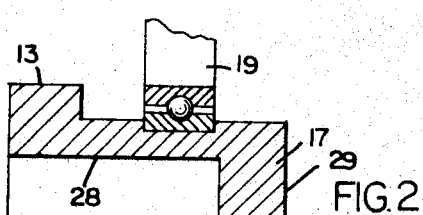
FIG.2
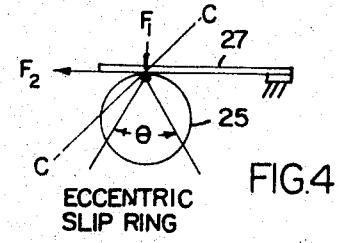
FIG.3
PRIOR ART
CONCENTRIC
SLIP RING
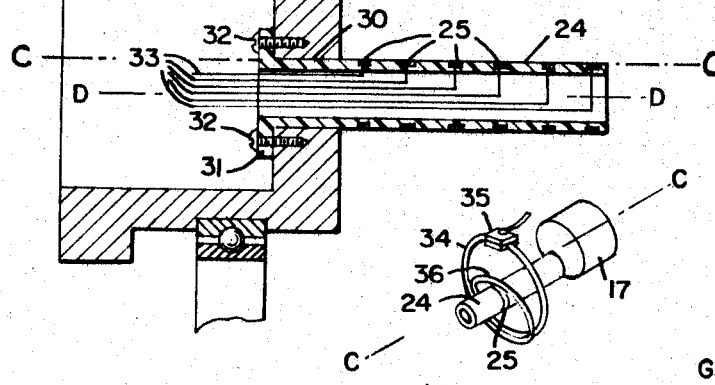
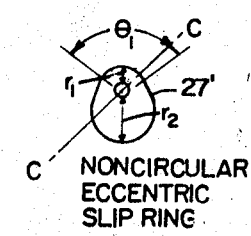
FIG.4
ECCENTRIC
SLIP RING
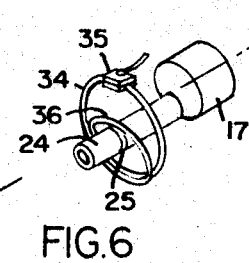
FIG.5
NONCIRCULAR
ECCENTRIC
SLIP RING
FIG.6
INVENTOR
GEORGE L. HILDEBRAND
BY Richard E. Hosley
ATTORNEY United States Patent Office 3,321,980
Patented May 30, 1967

3,321,980
GYROSCOPE APPARATUS
George L. Hildebrand, Marblehead, Mass., assignor to General Electric Company, a corporation of New York
Filed Dec. 29, 1964. Ser. No. 421,843
7 Claims. (Cl. 74—5)

The present invention relates generally to gyroscopes and more particularly to a gyroscope having an improved arrangement for establishing low-friction torque electrical connections between relatively rotatable parts of the gyroscope.

Universally mounted gyroscopes are commonly used on aircraft and other craft maneuvering in space to indicate the attitude of the craft about its control axes. Such applications require mounting arrangements giving 360° of rotational freedom about one or more of the gyroscope axes. The supporting gimbal structure of the gyroscope usually carries a number of electrical devices called "pick-offs" for measuring the angular deflection of the gyroscope relative to its support. In addition, electrical devices known as torquers are often used to precess the gyroscope to a desired reference position. Also, the gyroscope rotor is often driven by an electric motor. These electrical devices, all of which are mounted on the gyroscope structure, require apparatus for establishing a plurality of electrical connections between relatively rotatable parts of the gyroscope, and it is common practice to use a plurality of slip rings and brushes for this purpose.

A problem encountered with the use of slip rings and brushes for this purpose is that they generate friction torques, causing undesired precession error of the gyroscope, especially when multiplied to give the desired number of electrical circuit connections which, in some applications, may run as high as twenty. Slip ring friction torques can be reduced to some extent by reducing the diameter of the slip ring, but this approach is limited by the need for providing adequate electrical insulation between the slip rings and their supporting structure and the further need to provide adequate space for wires leading from the slip rings to the gyroscope, which wires ordinarily pass inside the slip ring supporting structure to permit free rotation of the gyroscope.

An object of the present invention is to provide an improved slip ring and brush construction for establishing a plurality of electrical connections between relatively rotatable parts of a gyroscope.

A further object of the invention is to provide a slip ring and brush construction for a gyroscope wherein the friction torques are substantially eliminated during normal operating conditions of the gyroscope.

Further objects and advantages of the invention will become apparent as the following description proceeds.

Briefly, in accordance with the invention, slip ring friction torque is substantially eliminated in the normal position of the gyroscope by an eccentric mounting of the slip ring. In the preferred arrangement the slip ring is mounted on the gyroscope gimbal so that its brush-contacting surface, which engages the brush when the gimbal is in its normal position, is coincident with the rotational axis of the gimbal. In this way brush pressure and friction forces exerted on the gimbal by the brush are applied at or close to the gimbal axis whereby the torques about the gimbal axis from these forces exerted on the gimbal and gyroscope are substantially eliminated during normal operating conditions.

For a better understanding of the invention, reference should be made to the following detailed description taken in connection with the accompanying drawings in which:

FIGURE 1 is a perspective view of a gimbal-mounted gyroscope provided with a slip ring and brush arrangement constructed in accordance with the invention;

FIGURE 2 is a cross-section view showing certain structural details of the slip ring shown in FIGURE 1;

FIGURE 3 is a schematic view of a conventional concentric slip ring illustrating the forces and torques involved;

FIGURE 4 is a schematic view of the eccentric slip ring arrangement of the present invention showing how the friction torques are reduced as compared with the conventional concentric slip ring shown in FIGURE 3;

FIGURE 5 illustrates a modification wherein the eccentric slip ring has a noncircular configuration; and FIGURE 6 illustrates a modified form of brush which is well suited for use on gyroscopes provided with eccentric slip rings.

Referring now to the drawings, FIGURE 1 shows in schematic form a universally mounted gyroscope 10 of the type known as a gyro vertical commonly used on aircraft to indicate or control the pitch and bank attitudes of the aircraft in flight. The gyroscope, which may, for example, be the symmetrical type described in U.S. Patent 2,731,836, Wendt, comprises a split rotor 11 supported on a bearing frame 12 for rotation about a vertical spin axis A—A. The bearing frame is rotatably mounted on a gimbal member 13 by means of trunnions 14 and 15 to permit rotation of the gyro rotor about a minor gimbal axis B—B. The gimbal 13 has trunnions 16 and 17 rotatably mounted on stationary trunnion supports 18 and 19 to permit rotation of the gimbal and gyroscope about the major gimbal axis C—C. As is customary with universally mounted gyroscopes, the gyro spin axis A—A and the major and minor axes B—B and C—C intersect at a center of suspension 0.

It will be understood that for use on aircraft to indicate or control pitch and bank attitudes, the trunnion supports 18 and 19 are mounted on the aircraft so that the major gimbal axis C—C will extend in the direction of the roll axis of the aircraft and the minor gimbal axis B—B will extend perpendicularly in the direction of the pitch axis of the aircraft. Because the gyroscope tends to maintain the orientation of its spin axis A—A in its vertical direction, pitch movements of the aircraft will be indicated by rotation of trunnions 14 and 15 relative to the gimbal 13 and roll movements by rotation of trunnions 16 and 17 relative to the trunnion supports 18 and 19. These pitch and roll movements are measured by pitch and roll electrical pick-off devices 20 and 21 of known construction having rotors driven, respectively, by the trunnions 14 and 16. Also, gimbal-mounted electric torquers (not shown) may be used to apply precession torques to the gyroscope about the axes B—B and C—C to erect the gyroscope to the vertical position.

In order to permit the gyroscope to measure pitch and bank attitudes in all positions of the aircraft about its pitch and roll axes, the gimbal 13 must be free to rotate 360° about the major axis C—C. If high-angle gimbal stops (not shown) of the type disclosed in U.S. Patent 2,730,813, Sinks, are used, rotation of the gyroscope bearing frame 12 about the axis B—B may be limited to slightly less than 180°, and for that reason conducting spirals such as those identified by the numerals 22 and 23 may be used to complete electrical connections running from gimbal 13 to the stator of the gyro rotor drive motor (not shown) mounted on the bearing frame 12.

Because the gimbal 13 must be free to rotate 360° for the reason pointed out above, it is customary to provide a plurality of slip rings and cooperating brushes to establish electric circuit connections between relatively stationary terminals and the electrical devices such as the gyro motor and pick-offs carried by the rotatable gimbal. In the constructions used heretofore, the slip rings have been mounted on one of the trunnions of the gimbal 13 so as to be concentric with the gimbal axis C—C. Because there is a friction force exerted between each slip ring and its cooperating brush, there is a friction force applied to the gyroscope about the axis C—C which causes a precession or tilting of the gyroscope spin axis A—A about the axis B—B in accordance with the well-known law of gyroscopic precession.

This tilting of thes pin axis causes undesirable indication error in the gyroscope, and this error may exceed desirable limits, especially when the number of slip rings and brushes is multiplied to provide a relatively large number of electrical circuit connections to electrical components mounted on the rotatable parts of the gyroscope.

In accordance with the present invention, friction error torques caused by the slip rings and brushes are substantially eliminated when the gyroscope gimbal is in or near its normal position by use of a novel slip ring and brush arrangement, the construction and operation of which will now be described.

As best shown in FIGURE 2 of the drawing, the slip ring apparatus comprises a tubular member 24 formed of electrically insulating material having a central longitudinal axis D—D. Extending around and supported by the outer surface of the member 24 are a plurality of axially spaced, annular slip rings 25 formed of electrically conducting material the axes of which coincide with the axis D—D of the support member 24. While six slip rings are shown for the purposes of illustration, it will be understood that the number of slip rings and cooperating brushes will be determined by the number of circuit connections required for electrical apparatus supported on gimbal 13. Preferably, the slip rings 25 are, as shown, embedded in the insulating member 24 so that the outer brush-contacting surfaces of the rings lie flush with the outer surface of member 24.

Supported on a relatively stationary terminal connection block 26 at one end are spaced brushes 27, the opposite ends of which are resilient and are biased to yieldingly bear against the corresponding slip rings 25.

As best shown in FIGURE 2, the member 24 is mounted on gimbal 13 as an extension of trunnion 17 which has a hollow section provided by a bore 28. An end section 29 of the trunnion has a circular hole 30 extending axially therethrough which is eccentric with respect to the gimbal axis C—C. The inner end of member 24 extends through the hole 30 and is provided with a flange 31 by means of which it is fastened to the trunnion end 29 by screws 32. In the preferred arrangement illustrated, the mounting arrangement is such that the tubular insulating member 24 and the slip rings 25 lie tangent to a plane containing the gimbal axis C—C for a purpose to be described.

While the gimbal 13 is free to rotate 360° relative to its supports 18 and 19 about the gimbal axis C—C during maneuvering of the aircraft on which the gyroscope 10 is mounted about its roll axis, for level flight conditions the gimbal occupies the normal position shown in FIGURE 1 wherein the gimbal 13 and trunnion axis B—B are horizontal with respect to the aircraft. The terminal block 26 supporting brushes 27 is oriented so that the brushes engage the portions of the brush-contacting surfaces of slip rings 25 that are coincident with the gimbal axis C—C when the gimbal is in the normal position shown. Because of this mounting arrangement of the slip rings and brushes, the contact pressure and friction forces exerted on the gimbal 13 through the slip rings by the brushes 27 are applied at the gimbal axis and therefore produce no torques about the gimbal axis tending to cause undesired precession of the gyroscope. An understanding of this action will be facilitated by reference to FIGURES 3 and 4 of the drawing to which reference will now be made.

FIGURE 3 shows the slip ring 25 mounted in the conventional way so that it is concentric with the gimbal axis C—C. The brushes 27 exert on the gimbal through the slip ring two forces. A first force $F_1$, caused by the contact pressure exerted by the resilient brushes 27, is directed through the gimbal axis C—C and hence produces no torque about that axis. A second force $F_2$, caused by friction between the brush and slip ring, is directed tangentially to the slip ring and hence produces a torque on the gimbal about the gimbal axis proportional to the radius $r$ which remains constant for all positions of the gimbal because of the concentric mounting of the slip ring.

FIGURE 4 shows the eccentric mounting of the slip ring in accordance with the present invention wherein the slip ring has a brush-contacting surface which is tangential to a plane containing the gimbal axis when the gimbal is in the normal position shown in FIGURE 1. In this case it will be noted that both the contact pressure and friction forces $F_1$ and $F_2$ are applied to the slip ring at the gimbal axis, and therefore neither force produces any torque on the gimbal about the gimbal axis. In other words the torque moment arm, which is equal to the radius $r$, is zero for this condition. When the gimbal 13 rotates to other positions, the radius $r$ will increase and some torque from the forces $F_1$ and $F_2$ will be applied to the gimbal. However, there is a range of operation close to the normal position indicated by the angle $\theta$ wherein the radius $r$ and the torques applied to the gimbal will remain small and considerably less than that encountered with the concentric slip ring. Thus, the result of the eccentric slip ring mounting is that during most commonly encountered conditions of operation of the gyroscope, the friction torque caused by the brushes bearing against the slip rings will be small while still permitting complete rotational freedom of the gimbal required during unusual maneuvers of the aircraft on which the gyroscope is carried. In this way precession error of the gyroscope caused by brush friction torques is substantially reduced with a concomitant improvement in the accuracy of the gyroscope. It will be understood that with both the concentric slip ring mounting of FIGURE 3 and the eccentric mounting of FIGURE 4, the slip rings and the support member 24 must have a diameter sufficiently large to permit adequate electrical insulation and to permit wires leading from the slip rings to pass through the inside of the tubular member 24 to the gimbal. These wires are designated by the number 33. This imposes a limit on friction torque reduction by decreasing the radius $r$ for the customary concentric slip ring mounting of FIGURE 3.

In FIGURE 5 of the drawing, there is shown a modification wherein an eccentric slip ring 27' has a noncircular configuration shaped something like a pear. An advantage of this configuration is that it permits a wider angle $\theta_1$ adjacent the normal gimbal position in which the friction torque movement arm as defined by the radius $r_1$ is small while permitting adequate clearance in the 180° position defined by the radius $r_2$ for conducting wires leading from the slip ring assembly.

In FIGURE 6 of the drawing, a modified form of brush is illustrated which is well suited for use on a gyroscope provided with eccentric slip rings. In this case the brush, identified by the number 34, is in the form of a wire loop secured at the top to a fixed support 35. The lower portion of the brush is shaped to form a second convolution or loop 36 of smaller diameter extending around the slip ring 25 and engaging the slip ring on one side. An advantage of this form of brush is that it has a greater degree of flexibility so as to accommodate more readily the eccentric movement of the slip ring. It also facilitates maintaining contact pressure between the brush and the slip ring when the assembly is subject to acceleration forces.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. In a gyroscope having a gimbal member freely mounted on a support member for rotation in either direction about a gimbal axis from a normal position, apparatus for establishing an electrical connection between the gimbal member and the support comprising,
 a slip ring mounted on one of said members, and
 a brush member mounted on the other of said members having a resilient portion engaging said slip ring in all positions of the gimbal,
 said slip ring being eccentrically mounted relative to the gimbal axis so that the point of contact of the slip ring with the brush lies closest to the gimbal axis when the gimbal is in its normal position whereby the friction torques imposed on the gimbal by the brush are minimum when the gimbal is in the normal position.

2. In a gyroscope having a gimbal member freely mounted on a support member for rotation in either direction about a gimbal axis from a normal position, apparatus for establishing an electrical connection between the gimbal member and the support comprising,
 a slip ring mounted on one of said members, and
 a brush mounted on the other of said members having a resilient portion engaging the slip ring in all positions of the gimbal,
 the slip ring being eccentrically mounted so as to lie approximately tangential to a plane containing the gimbal axis, and
 said brush being oriented to engage the slip ring at a point of contact coincident with the gimbal axis when the gimbal is in its normal position whereby friction torques imposed on the gimbal by the brush are substantially zero when the gimbal is in the normal position.

3. In a gyroscope having a gimbal freely mounted on a support member for rotation in either direction about a gimbal axis from a normal position, apparatus for establishing a plurality of electrical connections between the gimbal member and the support comprising,
 a tubular member mounted to rotate with the gimbal,
 a plurality of axially spaced coaxial slip rings carried by the tubular member, and
 a plurality of brushes mounted on a relatively stationary support having resilient portions engaging the corresponding slip rings in all positions of the gimbal,
 said tubular member being eccentrically mounted relative to said gimbal axis so that the points of contact of all the slip rings with their corresponding brushes lie closest to the gimbal axis when the gimbal is in its normal position whereby the friction torques imposed on the gimbal by the brushes are minimum when the gimbal is in the normal position.

4. In a gyroscope having a gimbal freely mounted on a support member for rotation in either direction about a gimbal axis from a normal position, apparatus for establishing a plurality of electrical connections between the gimbal member and the support comprising,
 a tubular member mounted to rotate with the gimbal,
 a plurality of axially spaced coaxial slip rings carried by the tubular member, and
 a plurality of brushes mounted on a relatively stationary support having resilient portions engaging the corresponding slip rings in all positions of the gimbal,
 said tubular member being eccentrically mounted so that the slip rings lie approximately tangential to a plane containing the gimbal axis, and
 said brushes being oriented to engage all the corresponding slip rings at points of contact coincident with the gimbal axis when the gimbal is in its normal position whereby the friction torques imposed on the gimbal by the brushes are substantially zero when the gimbal is in the normal position.

5. In a gyroscope having a gimbal member freely mounted on a support member for rotation in either direction about a gimbal axis from a normal position, apparatus for establishing an electrical connection between the gimbal member and the support comprising,
 a noncircular slip ring mounted on one of said members, and
 a brush member mounted on the other of said members having a resilient portion engaging said slip ring in all positions of the gimbal,
 said slip ring being eccentrically mounted relative to the gimbal axis so that the point of contact of the slip ring with the brush lies closest to the gimbal axis when the gimbal is in its normal position whereby the friction torques imposed on the gimbal by the brush are minimum when the gimbal is in the normal position.

6. In a gyroscope having a gimbal freely mounted on a support member for rotation in either direction about a gimbal axis from a normal position, apparatus for establishing an electrical connection between the gimbal member and the support comprising,
 a slip ring eccentrically mounted on one of said members with respect to the gimbal axis, and
 a brush mounted on the other of said members,
 said brush being shaped to form two loops of different diameters and mounted on the other of said members so that the smaller loop encircles the slip ring and makes contact at one side thereof in all positions of the gimbal,
 the contact with the slip ring being at a point closest to the gimbal axis when the gimbal is in its normal position whereby the friction torques imposed on the gimbal by the brush are minimum when the gimbal is in its normal position.

7. In a gyroscope having a gimbal freely mounted on a support for rotation about a gimbal axis in either direction from a normal position, low-torque apparatus for establishing an electrical connection between an electrical device carried on said gimbal and relatively stationary connecting means, said apparatus comprising,
 a slip ring formed of conducting material mounted on said gimbal to rotate therewith and connected to said electrical device, and
 a brush formed of conducting material and connected to said connecting means,
 said brush having a resilient portion engaging the slip ring to maintain electrical contact therewith in all rotary positions of the gimbal, and
 said slip ring being eccentrically mounted relative to the gimbal axis so that the point of contact of the slip ring with the brush is coincident with the gimbal axis when the gimbal lies in its normal position whereby torques exerted on the gimbal by the brush due to contact pressure and friction forces tending to cause precession of the gyroscope are reduced essentially to zero when the gimbal occupies its normal position.

References Cited

UNITED STATES PATENTS 2,766,625 10/1956 Swanson _____ 74—5
2,986,942 6/1961 De Lanty _____ 74—5

FRED C. MATTERN, Jr., *Primary Examiner.*

J. D. PUFFER, *Assistant Examiner.*